Figure 1:
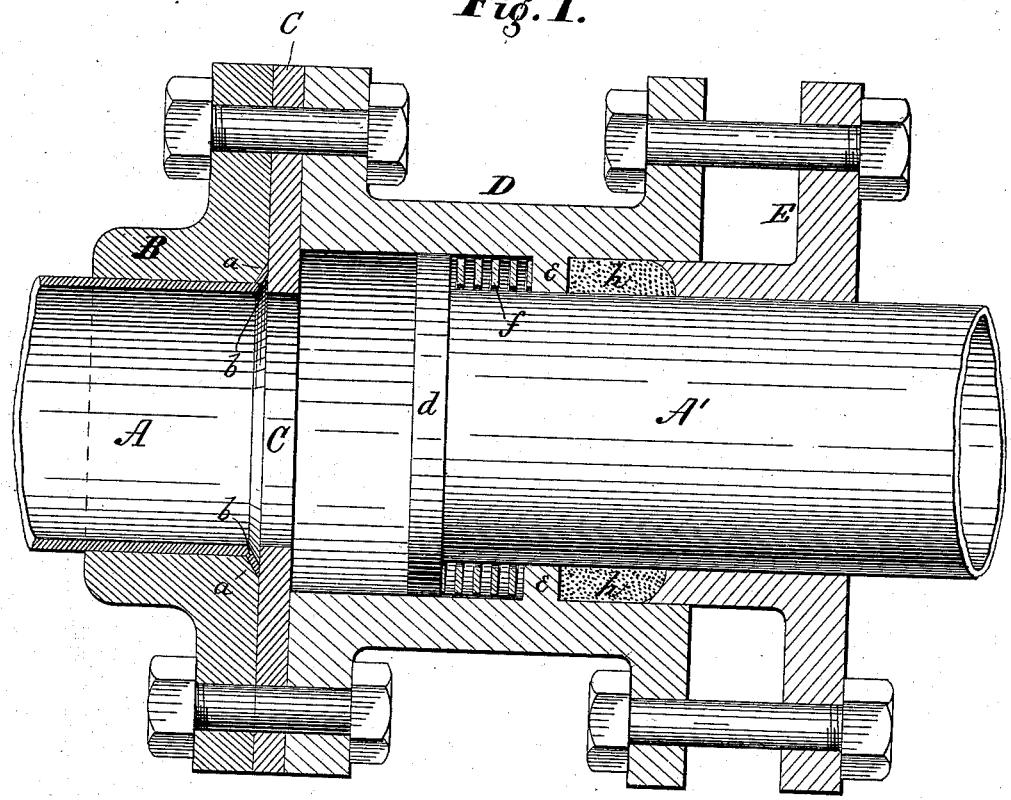

(No Model.)

L. SHOOK.
EXPANSION COUPLING FOR STEAM PIPES.

No. 264,965. Patented Sept. 26, 1882.

Witnesses:
Thomas J. Patterson
Saml. Cunningham

Levi Shook,
by Connolly Bros & McTighe
Attorneys.

UNITED STATES PATENT OFFICE.

LEVI SHOOK, OF PITTSBURG, PENNSYLVANIA.

EXPANSION-COUPLING FOR STEAM-PIPES.

SPECIFICATION forming part of Letters Patent No. 264,965, dated September 26, 1882.

Application filed July 29, 1882. (No model.)

*To all whom it may concern:*

Be it known that I, LEVI SHOOK, of Pittsburg, in the county of Allegheny and State of Pennsylvania, have invented certain new and useful Improvements in Expansion-Couplings for Steam-Pipes; and I do hereby declare that the following is a full, clear, and exact description of the invention, which will enable others skilled in the art to which it appertains to make and use the same, reference being had to the accompanying drawing, which forms a part of this specification, and in which—

Figure 1 is a longitudinal section of my coupling applied to the pipes.

This invention relates to the construction of expansion-couplings for steam-pipes, and has for its objects, first, a means of making a steam-tight and strong permanent portion of of the joint and an effective means of compensating for expansion and contraction in the other portion.

The invention consists in the construction and arrangement of parts, as hereinafter fully described and claimed.

In the drawing, A designates the steam-pipe whose end remains rigid in the coupling, and A' the pipe which is to be coupled thereto, but free to move backward or forward in the coupling.

B is a flanged sleeve, having its inner corner beveled off or rounded, as at a. This sleeve B is slipped upon the end of pipe A, and the latter is expanded to form the outwardly-projecting lip b, as shown. In this form the sleeve B cannot be removed from the pipe A unless the effort to pull it through is strong enough to contract the expanded flange b; but in such case the flange b would move through an arc, so that by placing a rigid washer in front of it such contraction is prevented. This is effected by the metal washer C, having central bore about the same diameter as pipe A, which lies flat against the flange of sleeve B and the lip b, as shown. The other side of the coupling consists of a double-flanged sleeve, D, the flange at one end for bolting to the sleeve B and at the other end to attach and tighten the gland E in order to pack the pipe A'. The bore of sleeve D is larger than the outer diameter of pipe A' to receive the collar d, which is brazed or otherwise formed on the inner end of pipe A', and has the inwardly-projecting rib e, closely fitting the pipe A' behind its collar d. Around pipe A', between its collar d and the rib e, I place a strong spiral spring, f, arranged to normally hold the collar d in a position about midway in sleeve D. Packing h is introduced in the stuffing-box formed between rib e and gland E, and after bolting the sleeves B and D together with the interposed washer C the gland E is tightened up to make the joint steam-tight. The pipe A is thus rigidly held in a fixed and steam-tight condition, and the expansion and contraction compensated in the sleeve D, the spring f holding the collar d' so as to take up the motion of direct expansion, and forming a cushion for direct contraction or for the spreading tendency of expansion where the steam-pipes approach the coupling in parallel lines and form a U. In all situations and under all conditions of expansion or contraction the coupling compensates and remains steam-tight.

I claim as my invention—

1. In a steam-pipe coupling, the combination of the flanged sleeve B, beveled, as at a, pipe A, expanded to form the lip b, and the metallic plate or washer C, covering said lip b, and suitable means for clamping the said washer against the face of sleeve B, substantially as described.

2. In a steam-pipe coupling, the combination of flanged sleeve D, having annular rib e, gland E, and packing h, with the pipe A', having collar d and the spring f, substantially as described.

3. The steam-pipe coupling consisting of flanged sleeve B, beveled, as at a, pipe A, having lip b, plate-washer C, flanged sleeve D, having rib e, pipe A', having collar d, spring f, packing h, gland E, and connecting-bolts, combined and arranged substantially as described.

In testimony that I claim the foregoing as my own I have hereto affixed my signature in presence of two witnesses.

LEVI SHOOK.

Witnesses:
T. J. MCTIGHE,
T. J. PATTERSON.